(12) United States Patent
Basso et al.

(10) Patent No.: US 8,161,137 B2
(45) Date of Patent: Apr. 17, 2012

(54) ENVIRONMENT DELIVERY NETWORK

(75) Inventors: Andrea Basso, Marlboro, NJ (US); Lee Begeja, Gillette, NJ (US); Zhu Liu, Marlboro, NJ (US); Bernard S. Renger, New Providence, NJ (US); Behzad Shahraray, Holmdel, NJ (US)

(73) Assignee: AT&T Intellectual Property I., L.P., Atlanta, GA (US)

( * ) Notice: Subject to any disclaimer, the term of this patent is extended or adjusted under 35 U.S.C. 154(b) by 276 days.

(21) Appl. No.: 12/355,085

(22) Filed: Jan. 16, 2009

(65) Prior Publication Data

US 2010/0185891 A1 Jul. 22, 2010

(51) Int. Cl.
*G06F 15/16* (2006.01)

(52) U.S. Cl. .......................... 709/220; 709/224; 709/228

(58) Field of Classification Search .................. 709/203, 709/220, 228; 715/702
See application file for complete search history.

(56) References Cited

U.S. PATENT DOCUMENTS

| | | | |
|---|---|---|---|
| 6,012,152 A * | 1/2000 | Douik et al. ..................... | 714/26 |
| 6,427,142 B1 * | 7/2002 | Zachary et al. ................. | 706/49 |
| 6,732,144 B1 * | 5/2004 | Kizu et al. ..................... | 709/203 |
| 7,292,956 B1 | 11/2007 | Guday et al. | |
| 7,440,819 B2 * | 10/2008 | Morel et al. ................... | 700/245 |
| 7,668,885 B2 * | 2/2010 | Wittke et al. ................... | 707/705 |
| 7,752,544 B2 * | 7/2010 | Cheng et al. ................... | 715/701 |
| 7,835,931 B2 * | 11/2010 | Bayne ........................... | 705/7.38 |
| 2002/0010759 A1 * | 1/2002 | Hitson et al. ................... | 709/219 |
| 2005/0267817 A1 * | 12/2005 | Barton et al. ................... | 705/26 |
| 2008/0126930 A1 * | 5/2008 | Scott .............................. | 715/702 |
| 2008/0310707 A1 | 12/2008 | Kansal et al. | |

OTHER PUBLICATIONS

Gutierrez, Mario et al., "Mediators: Virtual Haptic Interfaces for Tele-operated Robots", Proceeding of the 2004 IEEE International Workshop on Robot and Human Interactive Communication, Kurashiki, Okayama Japan, Sep. 20-22, 2004, pp. 515-520.

"Method for Optimizing Data Collection in Virtual Worlds Mirrored to Physical Realities", IP Com. Journal, West Henrietta, New York, Mar. 24, 2009.

PCT International Search Report corresponding to PCT Application PCT/US20101000072 filed Jan. 13, 2010 (6 pages).

PCT Written Opinion of the International Searching Authority corresponding to PCT Application PCT/US2010/000072 filed Jan. 13, 2010 (10 pages).

* cited by examiner

*Primary Examiner* — Khanh Dinh

(57) ABSTRACT

A method for environmental delivery network prioritizes groups of data for transmission based on a various factors such as synchronization requirements, endpoint configuration, and the fidelity of sensory stimuli reproduction. A device detects data missing from a group of data received from a server and replaces the missing data with replacement data based on a predetermined value. The predetermined value may be based on a default value specific to the sensory stimulus missing data, data received prior to the missing data, or data received prior to and after the missing data.

9 Claims, 3 Drawing Sheets

ENVIRONMENT DELIVERY NETWORK

BACKGROUND OF THE INVENTION

The present invention relates generally to data delivery networks, and more particularly to environmental delivery networks.

Ever since methods of transmitting information have been invented, people have been trying to transmit information in a way to capture, transmit and reproduce an experience. In the infancy of data transmission, the telegraph allowed signals to be transmitted as series of long and short tones that represented letters and numbers. The telegraph facilitated the communication of words. However, this type of communication required skilled workers to key and interpret the signals. The telephone overcame some of the deficiencies of the telegraph and provided a method of transmitting and receiving audio signals, specifically human speech. The telephone allowed users to communicate orally with one another other over great distances. The telephone also more closely reproduced the captured information in its original form (i.e. voice was captured, transmitted, and reproduced at another location). Over time, methods of capturing, transmitting, and reproducing visual images as well as sound were developed and television became the new standard of transmitting information to the masses. All of these methods of transmission comprise steps along a path that leads to the capture, transmission, and reproduction of an environment in which a user may experience not only video and audio but other sensory stimuli such as taste, smell, and temperature as well. The transmission of data representing an environment presents numerous problems because the amount of data required to be transmitted is large and data is often lost during the transmission process.

BRIEF SUMMARY OF THE INVENTION

One embodiment of the present invention is a method for delivering data over a network. The data delivered over the network represents an environment comprised of a plurality of sensory stimuli. The method comprises selecting a plurality of groups of data, prioritizing the groups relative to one another and transmitting the plurality of groups based on the prioritization, wherein each group comprises data representing sensory stimulus.

Other embodiments of the present invention are a device and computer readable medium for detecting data missing from one of a plurality of groups of data received. In both the device and the computer readable medium, each of the plurality of groups contains data representing one sensory stimulus of an environment. The device includes a receiver configured to receive the plurality of groups of data, a detector module configured to detect data missing from one of the plurality of groups of data received, and a data replacement module configured to replace missing data with replacement data representing the sensory stimulus associated with the missing data changing from a data value received prior to the missing data to a predetermined data value. The computer readable medium includes computer executable instructions defining steps comprising receiving a plurality of groups of data, detecting data missing from one of the plurality of groups of data received, and replacing the missing data with replacement data representing the sensory stimulus associated with the missing data changing from a data value received prior to the missing data to a predetermined data value.

These and other advantages of the invention will be apparent to those of ordinary skill in the art by reference to the following detailed description and the accompanying drawings.

DETAILED DESCRIPTION

Figure 1:
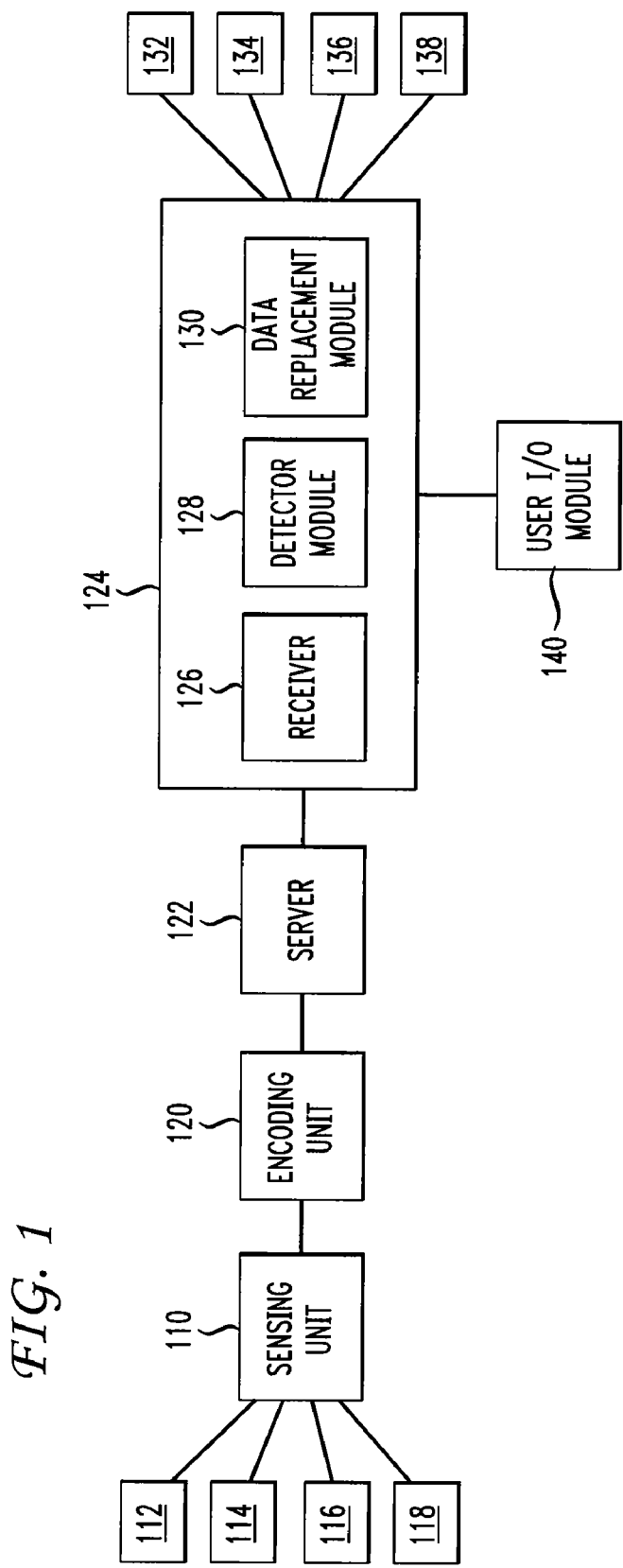
FIG. 1 shows a system for capturing, storing, transmitting, and reproducing an environment.

FIG. 1 shows a system for capturing, storing, transmitting, and reproducing an environment. Sensing unit 110 is shown including image sensor 112, audio sensor 114, olfactory sensor 116, and wind velocity 118 for sensing images, audio, scents, and wind velocity respectively. The sensors of sensing unit 110 are configured to receive various sensory stimuli and convert the stimuli into data representing the stimuli. Although the embodiment shown in FIG. 1 includes four sensors, other embodiments may include more or less sensors. It should be noted that any sensor that converts a sensory stimulus into data representing the stimulus may be used.

In one embodiment, sensing unit 110 may include numerous sensors for detecting various sensory stimuli necessary to reproduce the environment as desired. For example, to reproduce an environment such as a beach in Hawaii, various sensors may be used to detect stimuli a person would be exposed to while present at a beach in Hawaii. An image sensor is used for transforming a view of the ocean into data representing the scene. An audio sensor such as a microphone is used to convert acoustic signals into data representing the ambient sounds. Additional sensors such as wind velocity, temperature, humidity, scent, taste, etc. may be utilized as well depending on the stimuli and fidelity desired for the environment to be reproduced. Any sensor that converts a stimulus into data representing the stimulus may be used.

Sensing unit 110 is shown in communication with encoding unit 120 which is configured to encode the data received from sensing unit 110 representing stimuli. In one embodiment, encoding unit 120 receives the data representing stimuli from sensing unit 110 and stores data associated with each stimulus in a group thereby forming a plurality of groups of data with each group comprised of data representing a sensory stimulus. In one embodiment, each of the plurality of groups are then indexed or otherwise related to one another according to, for example, the time the sensory stimulus was received by the associated sensor. Although the plurality of groups are described in one embodiment as being related to one another temporally, in other embodiments the groups may be associated, synchronized, or indexed in other ways as well.

Encoding unit 120 may also be configured to code the plurality of groups of data according to a standard such as MPEG 2, MPEG 4, Dolby Digital or other standard. In other embodiments, the plurality of groups of data are coded according to a standard modified to include additional groups of data representing sensory stimuli not included in the original coding standard thereby extending the standard.

Encoding unit 120, in one embodiment, is configured to use data compression techniques on the plurality of groups of data in order to reduce the volume of data comprising each of the groups of data. Encoding unit 120 may be configured to use lossy compression techniques, lossless compression techniques, or a combination of the two compression techniques for a plurality of groups of data depending on the data to be compressed. Data compression may also be used to limit the overall fidelity of the plurality of groups of data or the fidelity of certain stimuli of an environment to be reproduced. For example, the data group representing images of an environment may be left uncompressed or compressed using lossless compression techniques in order to maintain the fidelity of the images to be reproduced while the data group representing wind velocity may be compressed using lossy compression techniques or techniques that result in decreased fidelity of the reproduced stimulus resulting in a lower volume of data contained in the associated group of data. In one embodiment, encoding unit 120 uses a data compression technique that lowers the volume of data required to reproduce a sensory stimulus associated with an environment by encoding each of the plurality of groups of data based on the change of the sensory stimuli associated with a particular group of data. For example, a group of data representing wind velocity may include data indicating that the wind should be produced at a certain velocity (i.e. a specified wind speed coming from a specified angle) starting at a certain time related to the other groups of data. Additional data associated with the group of data representing wind velocity is only required when the wind velocity should be changed. Thus, only data indicating when a specified wind velocity should be produced and data indicating a change in the wind velocity are required to reproduce a sensory stimulus associated with an environment.

Encoding unit 120 may also include functionality that allows the addition of one or more groups of data representing additional stimuli. For example, data representing a movie may consist of only audio and visual groups of data. Encoding unit 120, in one embodiment, includes functionality that allows a user to add other groups of data representing other stimuli such as wind velocity and temperature. The additional groups of data added to the original groups of data may be used to augment a user's experience by adding additional stimuli. For example a group of data representing a localized heat source may be added to groups of video and audio data associated with an action film allowing a user with an appropriately configured endpoint (described below) to experience the heat of an explosion originally represented by only audio and visual data.

Encoding unit 120 is shown in communication with server 122 which is configured to receive and store the plurality of groups of data transmitted by encoding unit 120. Server 122 is also in communication with and is configured to receive data from endpoint 124. In one embodiment, server 122 is configured to receive data pertaining to the sensory stimuli which endpoint 124 is configured to output, as well as the fidelity of the sensory stimuli endpoint 124 can reproduce. Server 122, in one embodiment, is also configured to encode one or more groups of data for transmission to endpoint 124. The encoding performed by server 122, in one embodiment, is based on the configuration of endpoint 124 and is in response to a request from endpoint 124 requesting the delivery of data representing an environment. The encoding performed by server 122 may be based on one or more factors such as the sensory stimuli endpoint 124 is configured to output as well as the fidelity of the stimuli to be output.

Endpoint 124 is configured to reproduce an environment based on data received from server 122. Endpoint 124 includes receiver 126 configured to receive and decode data transmitted from server 122 and, in other embodiments, signals from other devices as well (not shown). Receiver 126, in one embodiment, is configured to decode encoded data received from server 122 according to a selected coding scheme (e.g. MPEG 2, MPEG 4, a proprietary scheme, etc.). Endpoint 124 also includes detector module 128 which is configured to detect data missing from one or more of the plurality of groups of data received from server 122 via receiver 126. Endpoint 124 also includes data replacement module 130 which replaces data missing from one or more the plurality of groups of data. It should be noted that detector module 128 and data replacement module 28 may be implemented using hardware, software, or a combination of hardware and software.

Endpoint 130 also includes a plurality of devices 132, 134, 136, and 138 configured to reproduce an environment with the desired fidelity. Each of devices 132, 134, 136, and 138 converts one of the pluralities of groups of data into a human perceptible sensory stimulus. Display 132 is configured to output images based on the group of data representing visual stimulus. Speaker 134 is configured to output acoustic signals based on the group of data representing acoustic stimulus. Similarly, scent emitter 136 and wind machine 138 are configured to output scents and generate wind based on groups of data representing olfactory and wind velocity data respectively. It should be noted that while four output devices are shown, endpoint 124 may include more or less output devices. The number and type of output devices an endpoint includes may depend on one or more factors such as the desired stimulus and fidelity of the stimulus required to reproduce the desired environment. For example, endpoint 124 may include the required number of speakers to reproduce sounds encoded on a plurality of channels to produce an immersive "surround sound." Similarly, display 132 may be a conventional display such as a cathode ray tube or LCD display or display 132 may be a display system capable of reproducing an image subtending 360 degrees about a vertical axis thereby surrounding a viewer with images. Display 132, in one embodiment, may be a laser device capable of producing three dimensional images in air. Various embodiments may utilize various output devices for reproducing an environment with the desired number and fidelity of sensory stimuli.

Endpoint 124 is configured with user input/output (I/O) module 140 which allows a user to interact with endpoint 124. User I/O module 140 may include one or more I/O devices such as a keyboard, mouse, monitor, etc. that allow a user to request environments to be reproduced by endpoint 124, configure endpoint 124, or perform other operations.

Figure 2:
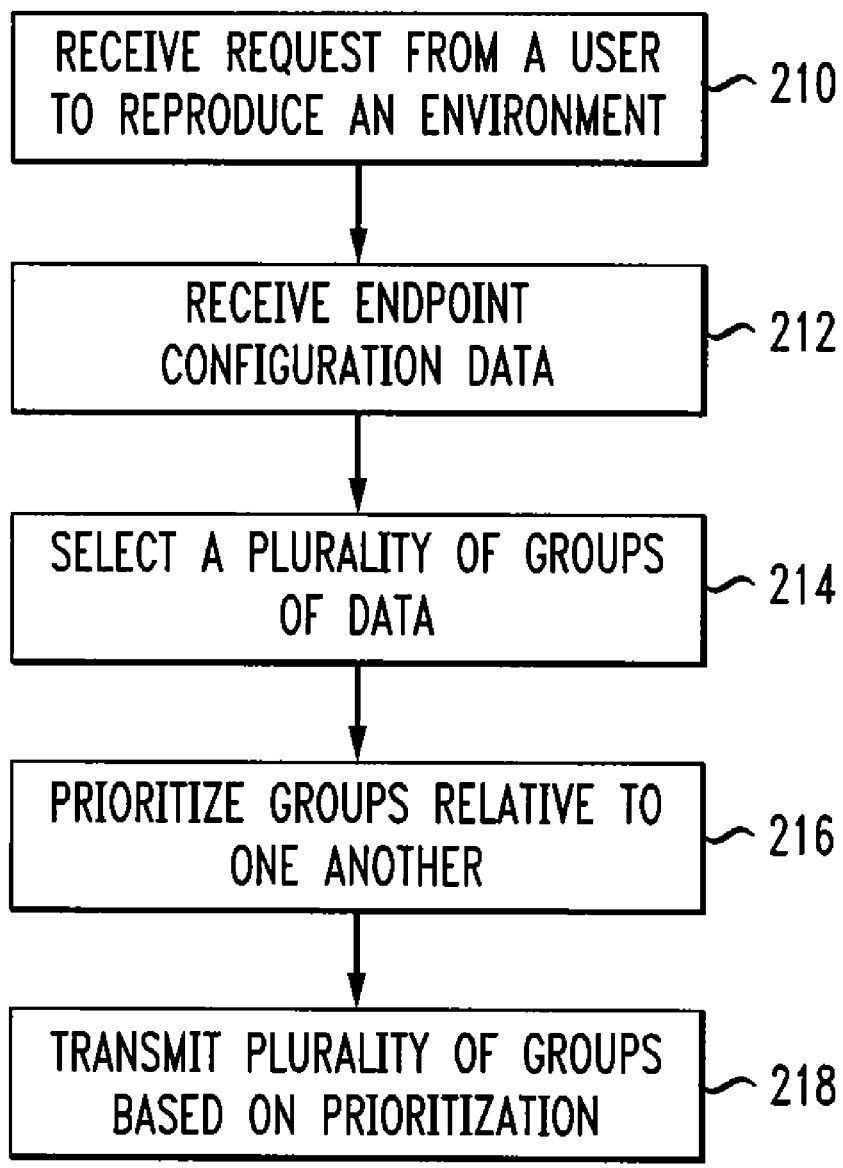
FIG. 2 is a flow chart illustrating a method according to one embodiment of present invention.

The flowchart shown in FIG. 2 will now be described in conjunction with the environmental delivery network shown in FIG. 1. One or more environments have been captured and stored in server 122 as described, in brief, as follows: Sensors 112, 114, 116, and 118 convert stimuli into data representing the stimuli which are then transmitted from sending unit 110 to encoding unit 120. The plurality of groups of data received from the plurality of sensors is encoded by encoding unit 120 using one of the coding methods described above. Encoding unit 120 transmits a plurality of groups of data to server 122 for storage, each group comprising data representing a sensory stimulus detected by one of sensors 112, 114, 116, or 118.

A user enters a request to endpoint 124 via user I/O module 140 to reproduce an environment. This request is forwarded from endpoint 124 and received by server 122 as shown in step 210. Endpoint 124, in one embodiment, also transmits configuration data which is received by server 122 as shown in step 212. The configuration data contains various information such as the number, type, and fidelity sensory stimuli that endpoint 124 is configured to reproduce.

It should be noted that endpoint 124, in one embodiment, may be configured to output less than the total number of sensory stimuli endpoint 124 is capable of outputting. For example, a user may configure endpoint 124 to not reproduce wind velocity despite the plurality of groups of data representing an environment including a group of data representing the wind velocity associated with the environment. Similarly, endpoint 124 may be configured to reproduce one or more stimuli at a lower fidelity than the fidelity an output device is capable of outputting.

Server 122 then selects a plurality of groups of data based on the environment requested to be reproduced. The selection of the plurality of groups may also be based on the configuration data received from endpoint 124. For example, if a user configures endpoint 124 to not reproduce wind velocity associated with an environment, server 122 will select the other groups of data related sensory stimuli of an environment and not select the group of data representing wind velocity.

Server 122 then prioritizes the plurality of groups of data relative to one another as indicated by step 216. Prioritization may be based on one or more factors including endpoint configuration and synchronization requirements of two or more of the plurality of groups of data selected. For example, if a user has configured endpoint 124 to output certain stimuli at the maximum fidelity the endpoint is capable of while other stimuli are output at less than the maximum fidelity the endpoint is capable of, then server 122 will assign the groups associated with the higher fidelity output a higher priority. Similarly, groups associated with lower fidelity output are assigned a lower priority.

Server 218 then transmits the plurality of groups of data to endpoint 124 as shown in step 218 based on the prioritization of step 216. Server 218 may transmit the plurality groups of data to endpoint 124 via any number of transmission methods including wired and wireless methods.

It should be noted that the transmission of a plurality of groups of data representing an environment involves the delivery of a large amount of data. The transmission of large amounts of data typically results in a portion of data not being received due to interference or other reasons.

Figure 3:
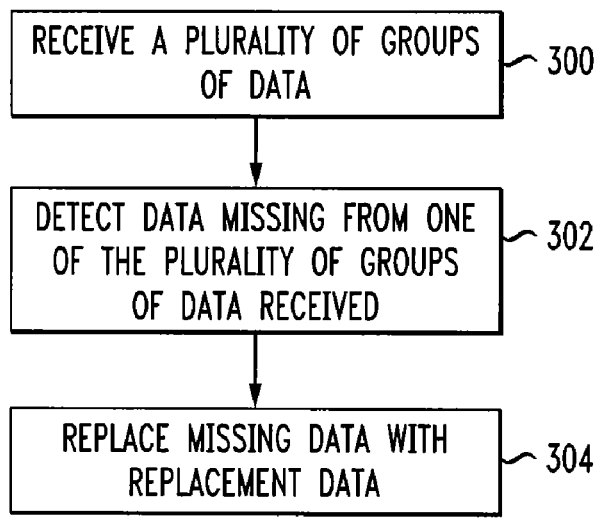
FIG. 3 is a flowchart showing a method according to an additional embodiment of the present invention.

FIG. 3 shows a flow chart of a method for addressing data lost during the transmission of a plurality of groups of data representing an environment over an environment delivery network. The method of FIG. 3 will now be described in conjunction with the environment delivery network of FIG. 1.

Receiver 126 of endpoint 124 receives a plurality of groups of data as shown in step 300 of FIG. 3. The plurality of groups of data are then analyzed by detector module 128 to detect data missing from one of the plurality of groups of data received. Missing data is defined to also include corrupt data as corrupt data typically cannot be used to generate a stimulus associated with a group of data and can therefore be addressed in the same manner as missing data. Missing data, in one embodiment, is detected using traditional error detection methods such as, for example, checksums or cyclic redundancy checks. In one embodiment, a group of data may be compared with other groups of data to determine if the group of data in question contains data consistent with the other groups of data received. If one group of data is determined to be inconsistent with other groups of data associated with the plurality of groups of data, the inconsistent group of data may be designated as missing. Missing data is then replaced with replacement data by module 130 as shown in step 304 of FIG. 3. In one embodiment, detector module 128 is configured to detect a group of data missing from the plurality of groups of data received and data replacement module 130 is configured to generate the missing group of data as described below.

In one embodiment, replacement data is based at least in part on the sensory stimuli associated with the group of data from which the data is missing. In one embodiment, data missing from a group of data may be replaced with a data value representing the missing data changing from the last received data value to a predetermined data value. For example, if data is missing is from the group of data representing scents, and the predetermined data value for data missing from the scent group of data is a value representing the emission of no scent at all, missing data will be replaced with a value that represents the output of a scent at a level having an intensity less than the intensity of output for the data received immediately prior to the missing data. Should data for the group of data continue to not be received, the replacement data value provided will continue to approach the predetermined value. In the example of data missing from the group of data representing scent, the replacement data would approach the predetermined value, in this case, no output of a scent, according to a predetermined formula. Such formulas may be defined depending on the sensory stimulus related to the missing data. For example, it may be desirable for a scent output to approach a predetermined value slower than when the missing data is detected for another sensory stimulus such as sound.

In an alternative embodiment, the predetermined data value is based at least in part on data received, for the group of data missing data, prior to the detection of the missing data. For example, if the data received prior to the missing data has been approximately the same value for an extended period of time, the predetermined data value may be a value approximately equal to the data values received prior to the missing data.

In another alternative embodiment, the predetermined data value is based at least in part on data received, for the group of missing data, prior to the detection of the missing data and data received, for the group of missing data, after the detection of missing data. For example, scent data received prior to missing data and scent data received after the missing data may be used to calculate of value for the predetermined data value to replace the missing data. The predetermined data value may be calculated using interpolation or other calculation methods.

The predetermined data value to replace data missing from one of the plurality of groups of data may be based on data received for other groups of data. For example, if data for wind velocity is missing, other groups of data such as the group of data representing visual images may be used to determine what the value of the missing data should be. If the group of data representing video is determined to be displaying a images of a tornado, the missing data may be replaced with a value representing a high wind velocity in a direction appropriate for the data representing the images of the tornado. In other embodiments, data from multiple groups of the plurality of groups may be used to determine what missing data should be. For example, a group of data representing images of a tornado may be used in conjunction with group of data representing the sounds or wind noise of a tornado may be used to determine what value the missing data should be.

Endpoint 124, in one embodiment, is configured to generate a group of data representing a sensory stimulus to be output based on the groups of data received, despite the groups of data received not including groups of data representing one or more sensory stimuli endpoint 124 is configured to output. It should be noted that this embodiment differs from others described above in that, in this embodiment, a group of data is not missing due to transmission losses, but because the group of data representing a sensory stimuli is not transmitted. The group of data representing a sensory stimulus may not be transmitted for a variety of reasons such as bandwidth limitations or server limitations. Alternatively, the group of data representing a sensory stimulus may not have been generated because the sensory stimulus was not detected or recorded for a particular environment. For example, groups of data representing visual and auditory stimuli may be received by an endpoint configured to additionally output wind. Endpoint 124, in one embodiment, is configured to analyze the visual and auditory groups of data received and generate a group of data representing wind velocity. The group of data representing wind velocity is generated by analyzing the visual and auditory groups of data and determining the appropriate wind velocity to be output from the endpoint. For example, for a beach environment, an appropriate wind velocity to be output may be determined by analyzing the swaying of trees detected in the group of data representing visual stimulus. The height of waves detected in the group of data representing visual stimulus may be used alternatively, or in addition, to the swaying of trees detected. Further, wind noise detected in the group of data representing auditory stimulus may be used as the basis for generating the group of data representing wind velocity or alternatively, the wind noise may be used in addition to the swaying of trees and the wave heights detected in the group of data representing visual stimulus to generate the group of data representing wind velocity.

It should be noted that in other embodiments, the functions and operations described as being performed by sensing unit 110, encoding unit 120, server 122, and endpoint 124 may be performed by more or less devices. In addition, in other embodiments, the functions and operations described may be distributed across a plurality of devices or other hardware, software, or combinations of hardware and software. For example, encoding may take place in sensing unit 110 or server 122 thereby eliminating the need for a separate encoding unit 120.

Figure 4:
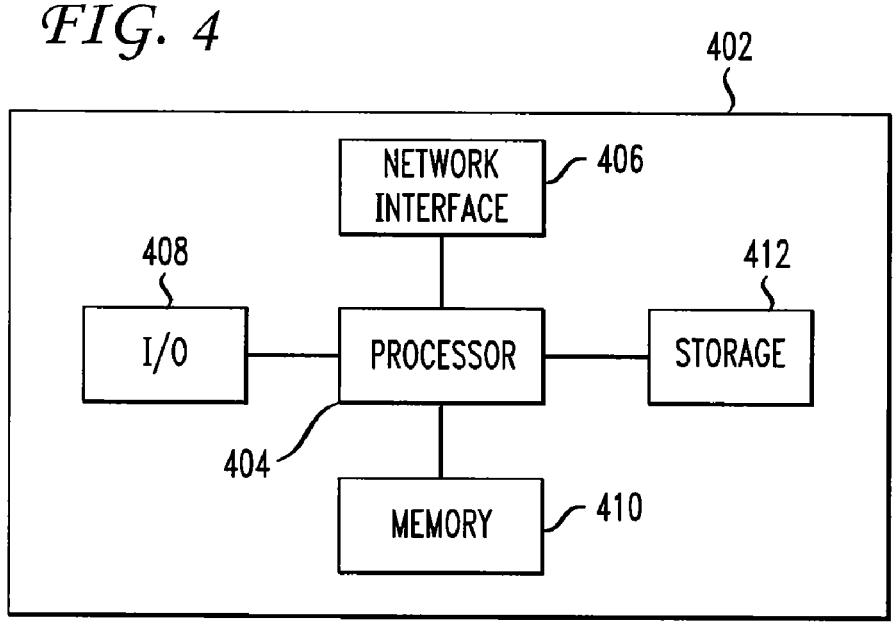
FIG. 4 shows a high level diagram of a computer on which several of the devices of the system shown in FIG. 1 may be implemented.

Sensing unit 110, encoding unit 120, server 122 and endpoint 124 may each be implemented using a computer. A high-level block diagram of such a computer is illustrated in FIG. 4. Computer 402 contains a processor 404 which controls the overall operation of the computer 402 by executing computer program instructions which define such operation. The computer program instructions may be stored in a storage device 412, or other computer readable medium (e.g., magnetic disk, CD ROM, etc.), and loaded into memory 410 when execution of the computer program instructions is desired. Thus, the method steps of FIGS. 2 and 3 can be defined by the computer program instructions stored in the memory 410 and/or storage 412 and controlled by the processor 404 executing the computer program instructions. For example, the computer program instructions can be implemented as computer executable code programmed by one skilled in the art to perform an algorithm defined by the method steps of FIGS. 2 and 3. Accordingly, by executing the computer program instructions, the processor 404 executes an algorithm defined by the method steps of FIGS. 2 and 3. The computer 402 also includes one or more network interfaces 406 for communicating with other devices via a network. The computer 402 also includes input/output devices 408 that enable user interaction with the computer 402 (e.g., display, keyboard, mouse, speakers, buttons, etc.) One skilled in the art will recognize that an implementation of an actual computer could contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for delivering data over a network, the data representing an environment comprised of a plurality of sensory stimuli, the method comprising:
    selecting a plurality of groups of data, each group of the plurality of groups comprising data representing a sensory stimulus from a respective one of the plurality of sensory stimuli;
    prioritizing the plurality of groups of data relative to one another based on the plurality of sensory stimuli and a requirement that at least two of the plurality of sensory stimuli be output from an endpoint in synchronization;
    transmitting the plurality of groups based on the prioritizing.

2. The method of claim 1 further comprising receiving configuration data from a particular endpoint, the configuration data indicating sensory stimuli the particular endpoint is configured to output.

3. The method of claim 2 wherein the prioritizing is further based on the configuration data.

4. An apparatus for delivering data over a network, the data representing an environment comprised of a plurality of sensory stimuli, the apparatus comprising:
    means for selecting a plurality of groups of data, each group of the plurality of groups comprising data representing a sensory stimulus from a respective one of the plurality of sensory stimuli;
    means for prioritizing the plurality of groups of data relative to one another based on the plurality of sensory stimuli and a requirement that at least two of the plurality of sensory stimuli be output from an endpoint in synchronization;
    means for transmitting the plurality of groups based on the prioritizing.

5. The apparatus of claim 4 further comprising means for receiving configuration data from a particular endpoint, the configuration data indicating sensory stimuli the particular endpoint is configured to output.

6. The apparatus of claim 5 wherein the prioritizing is further based on the configuration data.

7. A non-transitory computer readable medium having stored thereon computer executable instructions, the computer executable instructions for delivering data over a network, the data representing an environment comprised of a plurality of sensory stimuli, the computer executable instructions defining a method comprising:
    selecting a plurality of groups of data, each group of the plurality of groups comprising data representing a sensory stimulus from a respective one of the plurality of sensory stimuli;

prioritizing the plurality of groups of data relative to one another based on the plurality of sensory stimuli and a requirement that at least two of the plurality of sensory stimuli be output from an endpoint in synchronization; transmitting the plurality of groups based on the prioritizing.

8. The computer readable medium of claim 7 further comprising the operation of receiving configuration data from a particular endpoint, the configuration data indicating sensory stimuli the particular endpoint is configured to output.

9. The computer readable medium of claim 8 wherein the prioritizing is further based on the configuration data.

* * * * *